US008977955B2

(12) United States Patent
Veselov et al.

(10) Patent No.: US 8,977,955 B2
(45) Date of Patent: Mar. 10, 2015

(54) SEQUENTIAL LAYOUT BUILDER ARCHITECTURE

(75) Inventors: Evgeny N. Veselov, Sammamish, WA (US); Rossen Petkov Atanassov, Bellevue, WA (US); Michael Jacob Jolson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 12/732,075

(22) Filed: Mar. 25, 2010

(65) Prior Publication Data
US 2011/0239105 A1    Sep. 29, 2011

(51) Int. Cl.
G06F 3/00        (2006.01)
G06F 17/21       (2006.01)

(52) U.S. Cl.
CPC ..................................... *G06F 17/211* (2013.01)
USPC .......................................................... 715/234

(58) Field of Classification Search
USPC .................................. 715/234, 243, 254, 255
See application file for complete search history.

(56) References Cited

U.S. PATENT DOCUMENTS

| | | | |
|---|---|---|---|
| 4,891,771 A | 1/1990 | Edel et al. | |
| 5,557,722 A | 9/1996 | DeRose et al. | |
| 5,633,996 A | 5/1997 | Hayashi et al. | |
| 5,784,487 A | 7/1998 | Cooperman | |
| 5,926,825 A | 7/1999 | Shirakawa | |
| 5,991,536 A * | 11/1999 | Brodsky et al. | 717/104 |
| 6,374,273 B1 | 4/2002 | Webster | |
| 6,763,388 B1 * | 7/2004 | Tsimelzon | 709/228 |
| 7,246,306 B2 | 7/2007 | Chen et al. | |
| 7,337,392 B2 | 2/2008 | Lue | |
| 7,353,452 B2 | 4/2008 | Boehme et al. | |
| 7,415,452 B1 | 8/2008 | Ayers | |
| 7,644,356 B2 | 1/2010 | Atkins et al. | |
| 8,881,002 B2 | 11/2014 | Veselov et al. | |
| 2001/0032216 A1 | 10/2001 | Duxbury | |
| 2002/0073125 A1 | 6/2002 | Bier | |
| 2002/0156815 A1 | 10/2002 | Davia | |
| 2004/0006742 A1 | 1/2004 | Slocombe | |
| 2004/0148571 A1 | 7/2004 | Lue | |
| 2005/0264847 A1 | 12/2005 | Suzuki | |

(Continued)

FOREIGN PATENT DOCUMENTS

CN        1679028        10/2005

OTHER PUBLICATIONS

"Non-Final Office Action", U.S. Appl. No. 12/732,088, (Dec. 27, 2011), 19 pages.

(Continued)

*Primary Examiner* — Kyle Stork
(74) *Attorney, Agent, or Firm* — Bryan Webster; Kate Drakos; Micky Minhas

(57) ABSTRACT

Layout processing techniques have been described that allow processing of structured documents to be conducted, and for associated layout to be accomplished in a sequential manner. The layout process is split into multiple, smaller steps that can be executed sequentially. In at least some embodiments, a layout builder is utilized in conjunction with a stack to control layout execution on respective levels of the structural hierarchy of a structured document. Immutable data structures are utilized and allow for parallel execution of sequential layout operations. In at least some embodiments, partial execution of the layout sequence can be performed to produce usable data.

20 Claims, 7 Drawing Sheets

(56) References Cited

U.S. PATENT DOCUMENTS

| | | | |
|---|---|---|---|
| 2006/0041556 | A1 | 2/2006 | Taniguchi et al. |
| 2006/0092454 | A1 | 5/2006 | Narusawa et al. |
| 2006/0136811 | A1 | 6/2006 | Burago et al. |
| 2007/0083730 | A1* | 4/2007 | Vorbach et al. ............... 712/10 |
| 2007/0220423 | A1* | 9/2007 | Charbonneau et al. ....... 715/517 |
| 2008/0022197 | A1 | 1/2008 | Bargeron et al. |
| 2008/0109477 | A1 | 5/2008 | Lue |
| 2008/0201697 | A1* | 8/2008 | Matsa et al. ................. 717/143 |
| 2008/0301545 | A1 | 12/2008 | Zhang et al. |
| 2008/0307047 | A1* | 12/2008 | Jowett et al. ................. 709/203 |
| 2009/0070413 | A1* | 3/2009 | Priyadarshan et al. ....... 709/203 |
| 2009/0182941 | A1* | 7/2009 | Turk ............................ 711/118 |
| 2009/0192941 | A1 | 7/2009 | Fournier et al. |
| 2009/0228782 | A1 | 9/2009 | Fraser |
| 2011/0153604 | A1 | 6/2011 | Yu et al. |
| 2011/0239106 | A1 | 9/2011 | Veselov et al. |
| 2013/0073943 | A1 | 3/2013 | Veselov |

OTHER PUBLICATIONS

"International Search Report", Mailed Date: Nov. 28, 2011, Application No. PCT/US2011/029745, Filed Date: Mar. 24, 2011, pp. 8.

Meyerovich, et al., "Fast and Parallel Webpage Layout", Retrieved at <<http://www.eecs.berkeley.edu/~lmeyerov/projects/pbrowser/pubfiles/tr.pdf>>, Apr. 26-30, 2010, pp. 16.

"Components—Official Grok v1.0 Documentation", Retrieved at <<http://grok.zope.org/doc/current/reference/components.html>>, Sep. 17, 2009, pp. 27.

Andrews, et al. "Testing Web Applications by Modeling with FSMs", Retrieved at <<http://citeseerx.ist.psu.edu/viewdoc/download-?doi=10.1.1.90.8011&rep=rep1&type=pdf>> Jan. 25, 2005, pp. 1-28.

"CSS Multi-Column Layout Module", *W3C Candidate Recommendation*, Retrieved from: <http://www.w3.org/TR/2011/CR-css3-multicol-20110412/> Aug. 30, 2011, (Apr. 12, 2011), 19 pages.

"Final Office Action", U.S. Appl. No. 12/732,088, (Apr. 16, 2012), 22 pages.

"PCT Search Report and Written Opinion", Application No. PCT/US2011/029722, (Nov. 30, 2011), 8 pages.

Johnson, R. B., "Understanding Smeared Documents", *IEE Colloquium on Document Image Processing and Multimedia* (Ref. No. 1999/041), Mar. 23-25, 1999, available at <http://ieeexplore.ieee.org/stamp/stamp.jsp?tp=&arnumber=773123>, (Mar. 23, 1999), 6 pages.

"Foreign Office Action", Chinese Application No. 201180015838.2, (May 24, 2013), 4 Pages.

"Non-Final Office Action", U.S. Appl. No. 13/233,408, (Jul. 2, 2013), 9 pages.

"Final Office Action", U.S. Appl. No. 12/732,088, (May 15, 2013), 26 pages.

"Non-Final Office Action", U.S. Appl. No. 12/732,088, (Oct. 25, 2012), 23 pages.

"Foreign Office Action", Chinese Application No. 201180015838.2, (Nov. 22, 2013), 11 Pages.

"Non-Final Office Action", U.S. Appl. No. 12/732,088, (Sep. 19, 2013), 22 pages.

"Decision to Grant", CN Application No. 201180015838.2, Mar. 28, 2014, 3 Pages.

"Notice of Allowance", U.S. Appl. No. 12/732,088, Jun. 10, 2014, 6 pages.

"Notice of Allowance", U.S. Appl. No. 13/233,408, Mar. 17, 2014, 8 pages.

"Foreign Office Action", CN Application No. 201180015863.0, Jun. 5, 2014, 19 pages.

\* cited by examiner

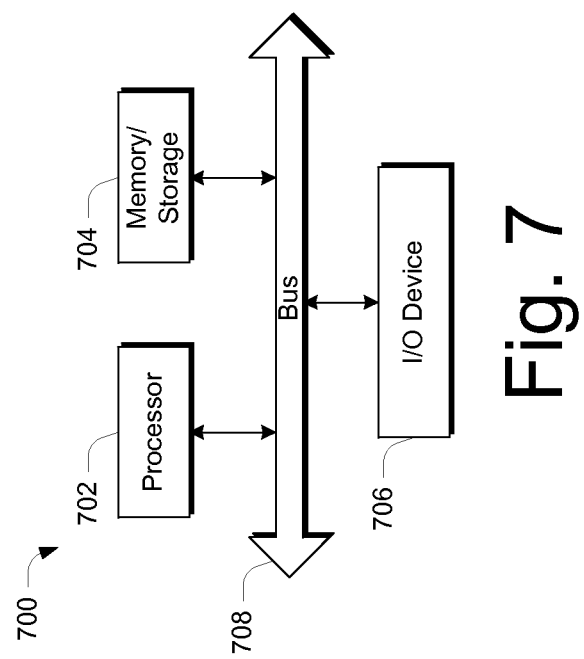

SEQUENTIAL LAYOUT BUILDER ARCHITECTURE

BACKGROUND

Rendering structured Web content, such as HTML and CSS content using a Web browser, typically involves processing a structured document including markup to ascertain the layout of the content so that it can be presented by the Web browser. Such processing can include content position, size, and shape calculations to ascertain, from the markup, how the associated content is to be presented on a screen or display. For usability and user perception, it is desirable that layout and presentation algorithms work quickly and correctly according to applicable standards.

Throughout the industry, layout processing is widely performed in a recursive fashion. For example, such processing can include initiating processing operations at a root node of HTML markup and processing downward through the markup to the leaf nodes in a recursive fashion. This processing is typically done on the entire HTML document before it is presented. Further, modern multi-core architectures can permit processing to be performed in parallel. Yet, because of the recursive nature of layout processing, advantages to be achieved from parallel processing cannot be exploited.

The recursive nature of layout processing can also lead to repetition in the processing which, in turn, can degrade performance and the user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more embodiments, layout processing on a structured document is conducted in a sequential manner. The layout process is split into multiple, smaller steps that can be executed sequentially. In at least some embodiments, a layout builder is utilized in conjunction with a stack to control layout execution on respective levels of the structural hierarchy of a document. Immutable data structures are utilized and allow for parallel execution of sequential layout operations. In at least some embodiments, partial execution of the layout sequence can be performed to produce usable data.

BRIEF DESCRIPTION OF THE DRAWINGS

The same numbers are used throughout the drawings to reference like features.

FIG. 7 illustrates an example system that can be used to implement one or more embodiments.

DETAILED DESCRIPTION

Overview

Figure 1:
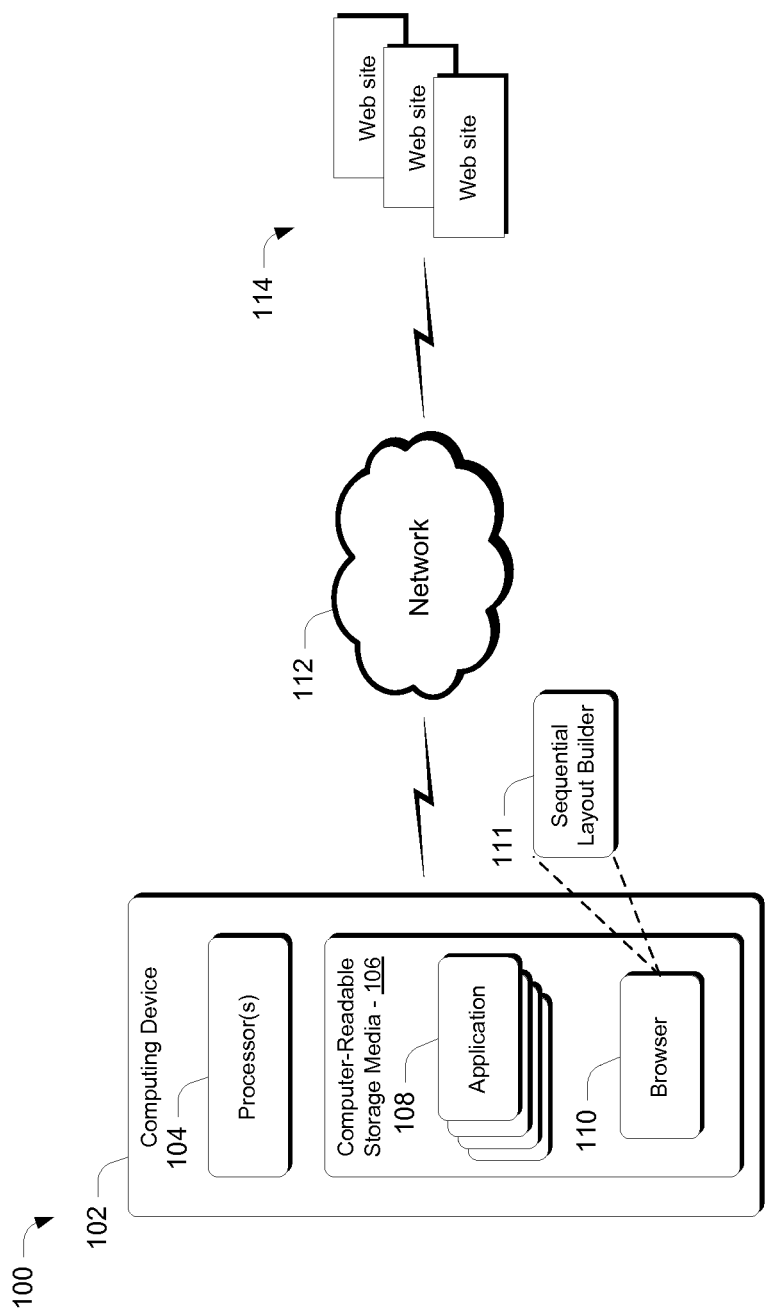
FIG. 1 illustrates an operating environment in which various principles described herein can be employed in accordance with one or more embodiments.

In accordance with one or more embodiments, layout processing is conducted in a sequential manner. The layout process is split into multiple, smaller steps that can be executed sequentially. In at least some embodiments, a layout builder is utilized in conjunction with a stack to control layout execution on respective levels of the structural hierarchy of a structured document. Immutable data structures are utilized and allow for parallel execution of sequential layout operations. In at least some embodiments, partial execution of the layout sequence can be performed to produce usable data. The techniques described herein can be used in connection with any type of structured document such as, by way of example and not limitation, an HTML document.

In one or more embodiments, sequential layout processing is organized, under the influence of the layout builder, as a non-recursive tree walk executed as a set of sequential steps such as, for example, "enter block", "exit block", "build a line", and the like. Individual steps can have a constant time to execute, and the entire process can be stopped after individual steps to produce a partial layout which is usable for rendering and user interaction.

In one or more embodiments, layout building data structures are organized to achieve efficient compactness by separating temporary data that is utilized during layout building, from persistent data that provides layout results for rendering and interaction. Temporary data is represented by a set of layout builders, one for each kind of layout. The layout builders are temporary objects that temporarily exist during layout processing. Persistent data, on the other hand, is represented as layout boxes that are stored in a resulting display tree that can be processed to present associated content. Doing so can utilize memory resources much more efficiently than in the past. For example, in the context of HTML processing, the number of layout builders that are present at any one particular time is defined by the depth of the HTML document, and not the breadth of the HTML document. Hence, temporary data that is represented by the layout builders does not have to reside in the resulting display tree.

In addition, both processed data and the processing algorithm are organized in a retractable manner. This allows execution of arbitrary layout fragments. This sequential retractability leads to improved performance for algorithms that can be used for backtracking attempts for scrolling, pagination, columnization, and the like.

Further, in at least some embodiments, layout results are represented by layout boxes that are designed to be immutable. This enables layout boxes to be reused in dynamic scenarios such as incremental partial update, parallel layout, progressive rendering, and backtracking layout execution.

Further, in at least some embodiments, a separation is enforced between specified, computed, and used values and structures. This allows partial and reusable computation across the whole layout pipeline. In the HTML context, specified values refer to how values are specified in the original HTML markup. These values can be contradictory, incomplete, and invalid. These inconsistencies can make specified values very difficult to utilize. Computed values are associated with a combination of normalized properties and normalized values. These values are not contradictory and are reliable. The used values represent values that are stored in the layout boxes.

In the discussion that follows, a section entitled "Operating Environment" is provided and describes one environment in which one or more embodiments can be employed. Following this, a section entitled "Example Architecture" describes an example architecture in accordance with one or more embodiments. Next, a section entitled "Example Method" describes an example method in accordance with one or more embodiments. Following this, a section entitled "Implementation Details" describes implementation details in accordance with one or more embodiments. Last, a section entitled "Example System" describes an example system that can be used to implement one or more embodiments.

Operating Environment

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 7.

In addition, computing device 102 includes a software application in the form of a web browser 110. Any suitable web browser can be used examples of which are available from the assignee of this document and others. In addition, computer-readable storage media 106 can include a sequential layout builder 111 that operates as described above and below. Sequential layout builder 111 can be implemented as a standalone component that can be utilized by applications 108 and browser 110. Alternately or additionally, the sequential layout builder 111 can be implemented as part of applications 108 and/or browser 110.

In operation, sequential layout builder 111 allows for the sequential processing of a structured document, such as an HTML document, and for layout to be computed in a sequential manner. The sequential layout builder utilizes an efficient architecture that employs the use of a layout builder to oversee the process of layout processing, box builder types that are knowledgeable of their own requirements for content processing, and associated layout boxes that are built by instances of the box builder types and which hold data that is to be ultimately rendered on display or screen.

In addition, environment 100 includes a network 112, such as the Internet, and one or more web sites 114 from and to which content can be received and sent. Such content can include structured documents such as HTML documents and other web content that can be operated upon by sequential layout builder 111 as described above and below.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion an example architecture that can be used to sequentially process structured documents such as HTML. In the discussion below, HTML is used as an example of a structured document. It is to be appreciated and understood that the techniques described below can be employed in connection with other types of structured documents without departing from the spirit and scope of the claimed subject matter.

Example Architecture

Figure 2:
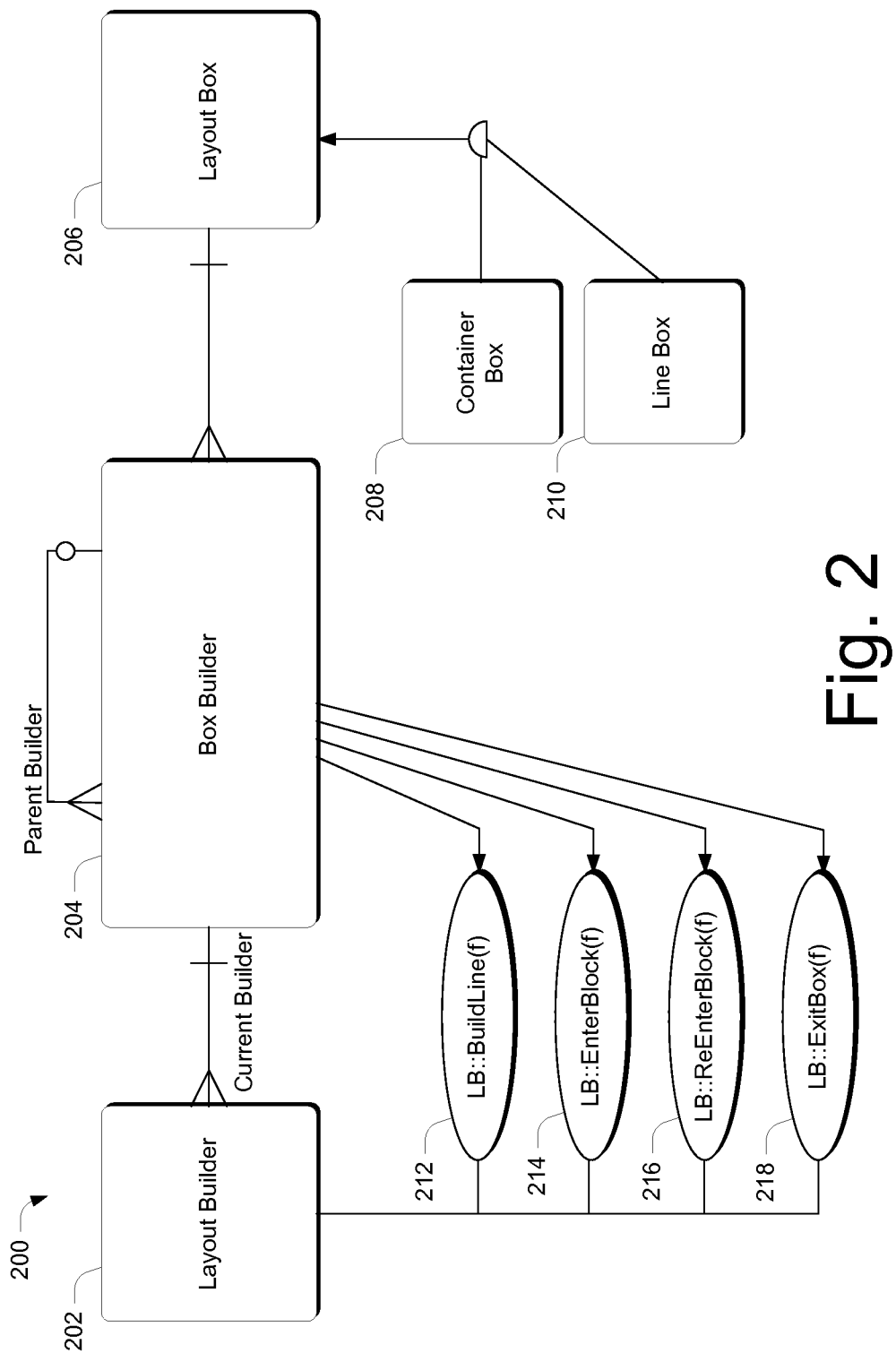
FIG. 2 illustrates an example architecture in accordance with one or more embodiments.

FIG. 2 illustrates an example architecture in accordance with one or more embodiments generally at 200. In this particular example, architecture 200 includes a layout builder 202, a box builder 204, a layout box 206, a container box 208 and a line box 210. In addition, architecture 200 includes representations of actions 212, 214, 216, and 218 that can be taken during sequential layout processing of HTML. The architecture is utilized to build a display tree of layout boxes that contain content or data, such as text, images, or graphical elements such as sequential vector graphics (Svg) elements that are to be rendered on a screen or display.

In the illustrated and described embodiment, layout builder 202 constitutes the layout engine or object that oversees or organizes the overall sequential layout processing. The layout builder 202 is responsible for instantiating layout box 206, and then communicating with box builder 204 to see that the layout box 206 is populated with content that is to be rendered on a screen or display. The box builder 204 is an object that is responsible for building a particular type of layout box. Specifically, there are different types of box builders only one of which is shown at 204. There are box builders for building tables, images, multicolor, lines, and the like. The box builders are specifically configured to build a particular piece of content. As will be appreciated by the skilled artisan, different types of content have different layout requirements. Each different type of box builder is knowledgeable of the different layout requirements for its associated content type, and can build a corresponding piece of content.

In the illustrated and described embodiment, box builder 204 is an abstract class that represents common properties and methods of these different types of builders, and thus defines the general contact of box building.

The layout builder 202 receives an HTML document and sequentially moves through the document, communicating with the box builder 204 which, in turn, populates the layout box 206 with its content. In this particular example, container box 208 and line box 210 represent sub-categories or sub-classes of layout box 206. The line box 210 represents an individual case that corresponds to one line of text. The container box 208 is a box that can contain other boxes such as container boxes and line boxes. Content such as images and Svg primitives are treated as container boxes.

Actions 212, 214, 216, and 218 constitute actions or functions that represent a sequence of primitive building steps that take place during sequential layout processing. Here, there are four actions: BuildLine(f), EnterBlock(f), ReEnterBlock (f), and ExitBox(f). The functions are prefixed with the abbreviation "LB" which stands for LayoutBuilder, as they are implemented as methods of this class. The main parameter for each of these methods is the current box builder, which is reflected in the figure by data flow arrows from box builder 204 toward each of the methods.

BuildLine(f)

This method corresponds to a primitive step of layout builder 202 on which one line of text is built. This is the smallest atomic portion of content that can be built by the layout builder. Note that all possible nested blocks, such as inline blocks, floaters or absolutely positioned blocks anchored in this line are not built recursively inside the Build-Line function. Instead they are built separately as siblings of the line via EnterBlock/ExitBlock callbacks.

EnterBlock(f)

This method is executed when the layout builder 202 encounters an opening tag of some block element such as DIV or TABLE.

ReEnterBlock(f)

This method is called when the block is entered on a subsequent page after being interrupted by a page break on a previous page.

ExitBox(f)

This method is executed when the layout builder 202 reaches the ending tag of the block element, or in a situation when fragmented (paginated) space is interrupted on a page boundary.

In operation, layout processing is organized as a sequence of steps that correspond to elementary structural units of HTML, i.e., element tags or runs of plain text. Layout builder 202 receives an HTML document and reads these units one after another and executes appropriate actions. When the layout builder encounters an opening tag, it identifies its type, creates an appropriate type-specific box builder, such as box builder 204, and activates the box builder by pushing it onto a building stack. The type-specific, box builder will then control the process of building layout content for that particular element. When the layout builder encounters a closing tag of an element, it communicates with the active, type-specific, box builder so that the resulting layout box is completed and attached to a display tree. During this process, when a line of text is encountered, a layout box in the form of a line box, such as line box 210, is created and inserted into the display tree.

Figure 3:
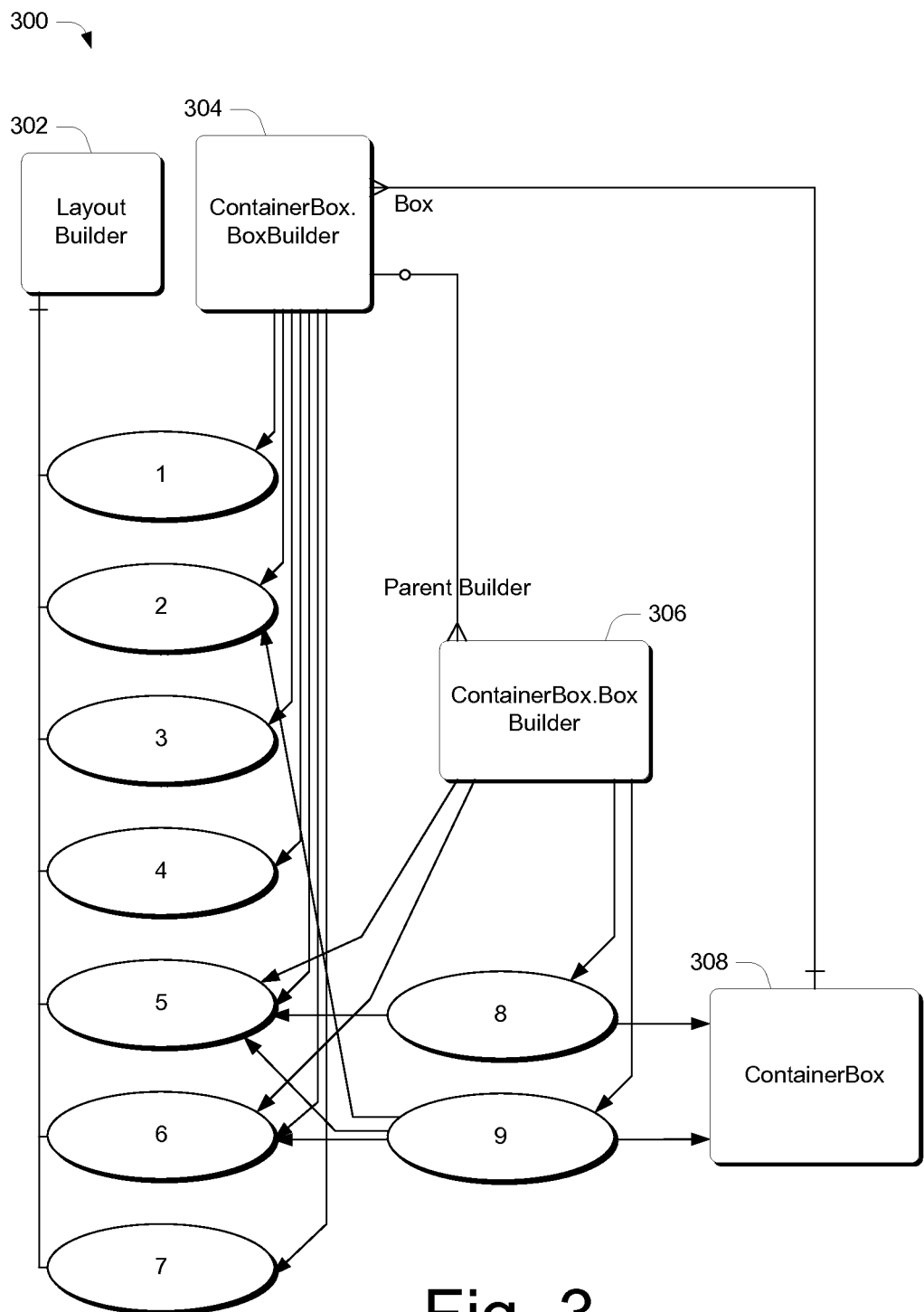
FIG. 3 describes a layout space allocation protocol in the sequential layout building process in accordance with one or more embodiments.

FIG. 3 is similar in some respects to FIG. 2 and describes a layout space allocation protocol 300 in the sequential layout building process in accordance with one or more embodiments. This figure also represents the extensibility model. FIG. 3 describes a protocol between a general layout builder and multiple specific box builders. Extensibility is facilitated in the event a new type of layout is desired, by simply inserting a new box builder type into the protocol. As will be described below in more detail, the protocol utilizes a set of virtual functions that are defined as an abstract class of the box builder. Different types of box builders can implement these virtual functions differently. From the layout builder's point of view, there are just a few of these functions that look the same to the layout builder. Their implementation, as noted above, is different depending on the box builder type. As the layout builder processes through HTML, and as it encounters tags and other content, it calls the respective functions on the associated box builder. As the layout builder moves through the content of the particular tag, it can call these different functions as appropriate on the box builder to enable the box builder to perform its construction so that an associated container box is built and ready for display. The process of movement between pieces of the HTML content, however, is controlled by the associated individual box builder who is specifically knowledgable of the content's structure.

In the illustrated and described embodiment, protocol 300 includes layout builder 302, ContainerBox.BoxBuilder 304, ContainerBox.BoxBuilder 306, and Container Box 308.

As in the above discussion, layout builder 302 represents the object that organizes the overall layout building process. Layout builder 302 works with individual box builders, represented by ContainerBox.BoxBuilder 304 in the figure. As noted above, ContainerBox.BoxBuilder is an abstract class that defines the general contract for many concrete subtypes of box builders to follow. It defines a set of virtual callbacks, here represented as the enumerated ovals, that the layout builder 302 calls during the different building steps.

The following table describes the association between an oval's enumeration and its associated virtual function. Following the table, each virtual function is described.

TABLE 1

| Oval Enumeration | Virtual Function Name |
|---|---|
| 1 | CBB.Constructor |
| 2 | CBB.MoveToNextPosition |
| 3 | CBB.GetChildBoxToReuse |
| 4 | CBB.OnChildBoxReuse |
| 5 | CBB.OnChildBoxEntry |
| 6 | CBB.OnChildBoxExit |
| 7 | CBB.Destructor |
| 8 | CBB.InitializeBoxSizing |
| 9 | CBB.CompleteBoxSizing |

CBB.Constructor

This virtual function is a callback that is called when the ContainerBox.BoxBuilder 304 is created to initialize it and place it in the context of the current layout building process.

CBB.MoveToNextPosition

This virtual function is a callback called to request the following position for layout builder 302 to process. This callback gives the ContainerBox.BoxBuilder an option to direct the layout building process in any desired direction. For example, it can be used for formatting the same content several times (e.g., for content measuring or scrollbar allocation or column balancing purposes). The result of this callback should be a next block for layout builder 302 to process. Note that this virtual function can be implemented differently in different box builders. This allows for extensibility and navigation through content in different directions and different sequences if desired.

CBB.GetChildBoxToReuse

This callback is used by layout builder 302 to ask whether some existing box can be reused for the given block. The existing box might be found in incremental update scenarios, such as when big parts of the layout remain unchanged and only small subtrees are modified and reformatted.

CBB.OnChildBoxReuse

This callback is called when the reusable box is found, and should be inserted into the new layout tree structure by the current ContainerBox.BoxBuilder.

CBB.OnChildBoxEntry

This callback is used when no reusable boxes were found for the current blocks and a whole box is to be re-built again. For this purpose the layout builder 302 notifies the parent box builder about the child box entering. After such notification a new box builder for a child block will be created, pushed on the stack and become current, so that layout builder 302 will continue its communication with the box builder on a nested level, until the end of the block is reached.

CBB.OnChildBoxExit

This callback is used to notify the parent box builder that one of its children's building is finished and the child box can be attached to the parent into the resulting layout tree. The parent box builder updates the available layout space to prepare for allocating the following boxes (if any).

CBB.Destructor

This callback notifies the box builder that layout builder 302 has reached its end, and is about to pop it from the context stack. At this moment all transitional data needed for box building will be released.

CBB.InitializeBoxSizing

This is a callback which is called from the OnChildBoxEntry callback by the parent box builder to give the space assigned to its child box before entering into the nested child level.

CBB.CompleteBoxSizing

This is a callback which is called from the OnChildBoxExit callback by the parent box builder to finalize the sizing of the child.

Example Method

Figure 4:
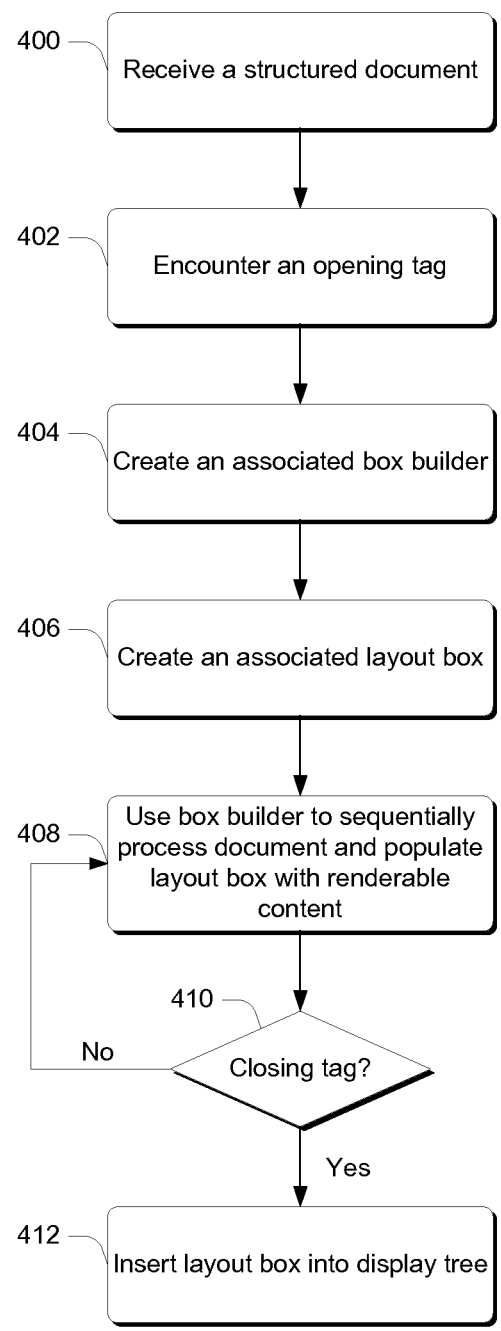
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, the method can be implemented by a suitably-configured sequential layout builder, such as sequential layout builder 111 in FIG. 1.

Step 400 receives a structured document. Any suitable type of structured document can be received. In at least some embodiments, the structured document comprises an HTML document. Additionally, the step can be performed in any suitable way. For example, the step can be performed by receiving an HTML document responsive to a user action, such as requesting a webpage using a browser. Once the structured document is received, sequential layout processing can begin. Accordingly, step 402 encounters an opening tag within the structured document. Step 404 creates an associated box builder. Examples of box builders are provided above. Step 406 creates an associated layout box. In the illustrated and described embodiment, individual box builder types are knowledgeable of how to build the content with which they are associated. This content, referred to above as persistent data, is placed into a layout box and constitutes the content that is to be rendered on a display screen.

Step 408 uses the box builder to sequentially process the structured document and populate the layout box with renderable content. During its sequential processing, step 410 ascertains whether a subsequent tag is a closing tag associated with the opening tag. If it is not, then the method returns to step 408 to continue sequential processing. If, on the other hand, the subsequent tag is a closing tag associated with the opening tag, step 412 causes insertion of the layout box into a display tree.

At this point, the method can return to step 402 and continue processing the structured document if more of the document remains. If more the document does not remain, the method can terminate and the content in the corresponding display tree can be rendered.

Having described in example method in accordance with one or more embodiments, consider now some implementation details in accordance with one or more embodiments.

Implementation Details

In the sections that follow, different aspects of an implementation are described. The material complements and embellishes the material discussed above. First, a section entitled "Separating Layout Building Data from Layout Results Data" describes how processing efficiencies can be achieved through data separation techniques that are made possible, at least in part, by the above-described architecture. Next, a section entitled "Layout Building State Machine" describes aspects of a state machine in accordance with one or more embodiments. Following this, a section entitled "Layout Box Immutability" describes aspects of immutable layout boxes. Finally, a section entitled "Content Computation" describes some details associated with specified values, computed values, and used values.

Separating Layout Building Data from Layout Results Data

In the recursive algorithm approach, which is not utilized by the presently-described approach, organizational temporary data is usually allocated on an execution stack as local variables of recursively called functions. This can adversely impact resource utilization, such as memory usage. In the illustrated and described sequential approach, a data stack is used for storing such temporary data or "layout building context". This approach, however, is not simply generalized data storage. Rather, the data stack is organized as hierarchically nested box builders, as described above. Recall from the discussion above, that each type of layout element (such as blocks, tables, images, floaters, and the like) utilize their own logic for building layout and their own set of temporary data. Type-specific box builders are objects that implement and encapsulate such specific data and layout building logic.

In the illustrated and described embodiment, each type of HTML element utilizes its own display object or layout box as described above. The layout boxes store layout sizing and positioning results and are used to render the content of the element appropriately.

Thus, accordingly to the inventive approach, data structure duality is utilized in the layout builder. Specifically, box builders serve as active mutable objects that are used in the process of layout building, and layout boxes serve as final immutable results of layout building that will be used later in rendering and user interaction.

Figure 5:
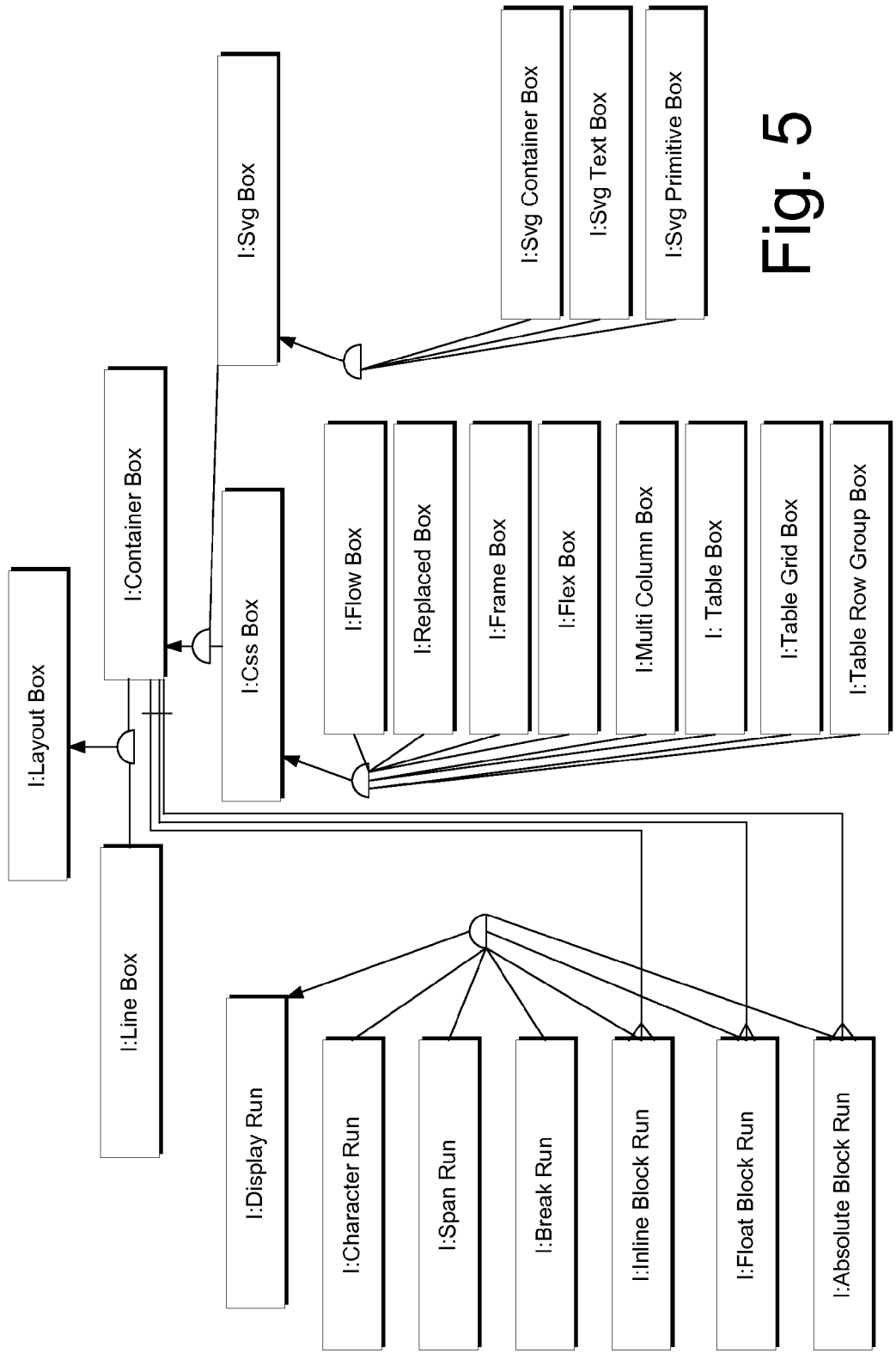
FIG. 5 illustrates a class hierarchy of layout boxes in accordance with one or more embodiments.

In the illustrated and described embodiments, according to the CSS definition of various types of layout elements, a class hierarchy of layout boxes is defined. This is illustrated in FIG. 5 and will be understood by the skilled artisan.

Figure 6:
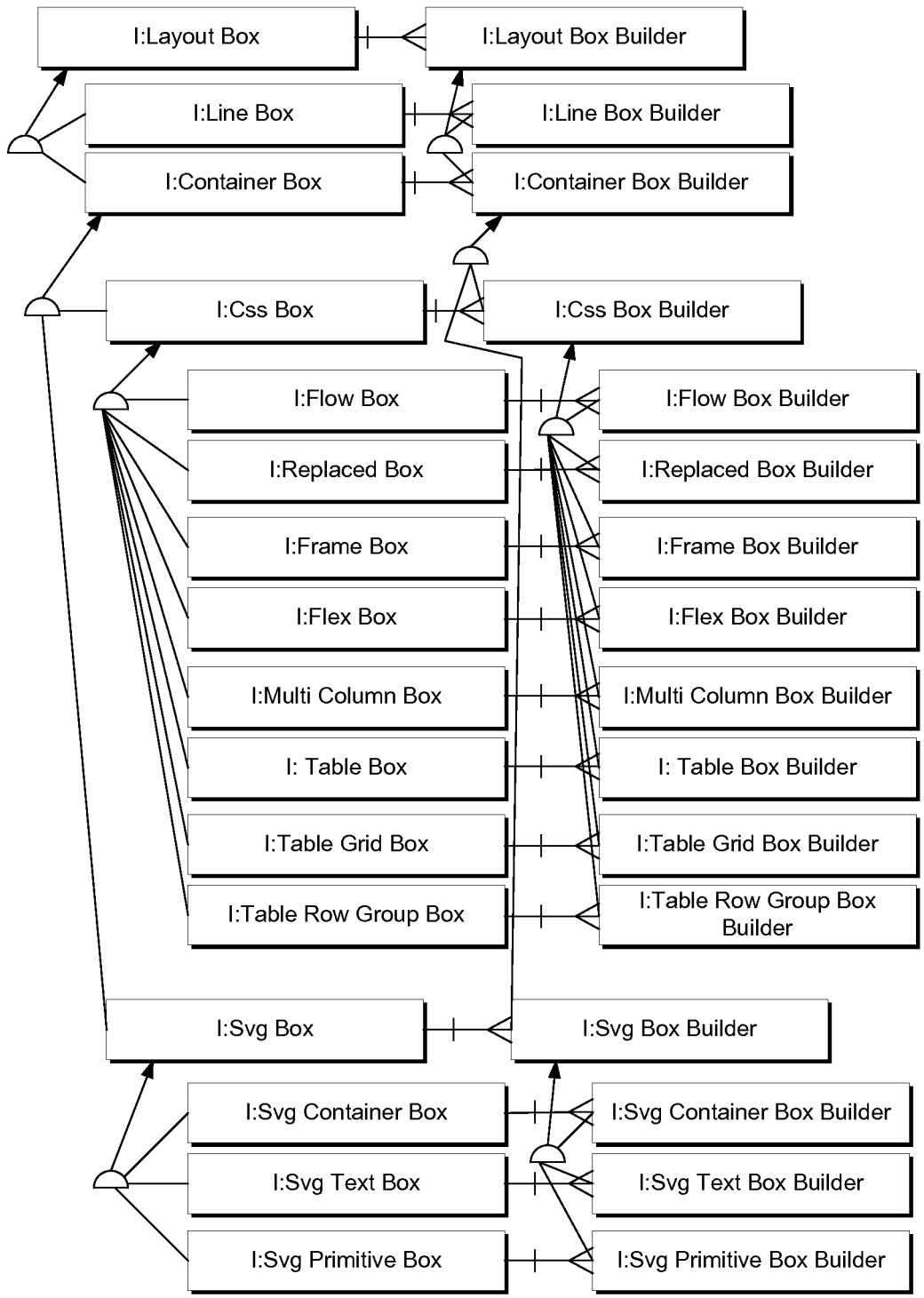
FIG. 6 illustrates a class hierarchy of box builders in accordance with one or more embodiments.

Parallel to the hierarchy of layout boxes, there exists a parallel hierarchy of classes for the box builders. In the object-oriented implementation, box builder classes are defined as nested in appropriate layout boxes to allow them to access private members of boxes in the process of building them. The box builder hierarchy is shown in FIG. 6 and will be understood by the skilled artisan.

Layout Building State Machine

As noted above, each box builder has its own logic that it utilizes to build layout. The box builders, however, have some common characteristics. One common characteristic that can be very useful is that the building process can be interrupted and resumed, reset to the beginning and restarted from any arbitrary point. This ability can be usefully leveraged for such processes as layout fragmentation for pagination, layout iterations for scroll-bar sizing, layout backtracking for column balancing, and the like.

For this reason, box builders are organized as finite state machines transitioning from one state to another depending on the properties of the content item they are currently processing. Some of such state machines are fairly straight forward (e.g. replaced box that is not supposed to have any content to lay out), while others can be very complicated (e.g. dealing with "full stacking context" containing static blocks, txt lines, inline blocks, floaters, absolutely positioned blocks, and at the same time handling such aspects of layout as scroll bar positioning, respecting fragmentation properties like "orphans", "widows", "keep-together", "keep-with-next", and the like). All this can make the logic of layout building pretty complicated, and the state-machine approach simplifies its organization and allows such processes as interruption, resuming, resetting, restarting, and the like. Further, the state-machine approach lends itself nicely to the sequential nature of the layout builder's logic.

Layout Box Immutability

In defining data structures for representing layout results, it can be desirable to separate positioning data from content and its sizing. This creates a possibility for re-using the same layout boxes in different positions for subsequent and parallel layout building processes.

For this reason, layout boxes are organized to contain simply their internal positioned content and sizing information, but not their positioning information. In addition, layout boxes are designed to be immutable, so that reusing boxes is as simple as just taking new references to them in multiple layout processes.

Content Computation

To make layout building more efficient, values that do not depend on available layout space can be computed before layout starts and stored as a computed content cache in the source markup tree (as purely functionally dependent data). This allows re-using this recomputed data multiple times during subsequent layout building for different available spaces.

In the layout builder approach described above, the abstract concept of "computed content" is defined as data dependent on content properties only, and not dependent on any space characteristics (like viewport size). There are several concrete subtypes of computed content, e.g., computed styles, schema fix-up structures for tables, flex boxes, generated content, list markers, first letter, and run-in. To work with both original and computed content, the layout builder is designed so that it utilizes an abstract concept of a layout node which unifies both original content and computed content. Such organization allows for pre-computation of computed content by demand and makes the layout builder logic independent of which kind of content it deals with. Such approach can enhance performance and mitigate problems associated with repeated computations.

Hence, the above-described architecture allows for sequential layout processing of an HTML document. This approach is more efficient than the above-mentioned recursive approach because it allows for finer-grained external control. As an example, consider the following.

Unlike recursion that cannot be interrupted, resumed, or started from a different position, sequential layout processing described above and below can be arbitrarily stopped and resumed. Sequential layout processing also allows for efficient techniques that are much more difficult to achieve with holistic recursion. For example, layout builder 202 (FIG. 2) can begin its work at arbitrary locations within an HTML document. For example, the layout builder can start processing from the middle of a large HTML document, continue layout processing and stop prior to the end of the HTML document. Doing so can produce usable, renderable content.

Related to this, somewhat, is the fact that results that appear in layout box 206 can be utilized prior to completion of the sequential layout processing for an HTML document. This can be desirable in contexts where overall execution is in a single-threaded environment. Further, a lengthy layout process, when organized sequentially, can be suspended between any steps to render the current display results and then resume to finish the remainder of the layout. This can improve the usability of HTML layout by making layout results available for user interaction earlier, thus producing better perceived performance.

Additionally, sequential layout processing can be leveraged in a parallel execution environment. Specifically, when multiple CPUs are available, concurrent layout builders can be utilized to process different parts of an HTML document and join the results to produce a complete display tree.

Having described various sequential layout builder embodiments, consider now an example system that can be utilized to implement one or more of the above-described embodiments.

Example System

FIG. 8 illustrates an example computing device 700 that can be used to implement the various embodiments described above. Computing device 700 can be, for example, computing device 102 of FIG. 1.

Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Component 704 can include volatile media (such as random access memory (RAM)) and/or non-volatile media (such as read only memory (ROM), Flash memory, optical disks, magnetic disks, and so forth). Component 704 can include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Layout processing techniques have been described that allow processing of structured documents to be conducted, and for associated layout to be accomplished in a sequential manner. The layout process is split into multiple, smaller steps that can be executed sequentially. In at least some embodiments, a layout builder is utilized in conjunction with a stack to control layout execution on respective levels of the structural hierarchy of a structured document such as an HTML document Immutable data structures are utilized and allow for parallel execution of sequential layout operations. In at least some embodiments, partial execution of the layout sequence can be performed to produce usable data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. One or more computer-readable hardware storage media embodying computer-executable instructions which, when executed, implement a software architecture comprising:
   a layout builder component of a browser configured to organize sequential layout processing, for rendering of a received structured document, the layout builder being a temporary object that exists during layout processing, the sequential layout processing comprising:
      identifying an opening tag in the received structured document;
      responsive to the identification, creating a box builder;
      pushing the created box builder onto a building stack to activate the created box builder;
   the box builder configured to:
      receive content for one of one or more layout boxes from the layout builder;
      populate the one of the one or more layout boxes with the received content to be rendered by the browser;
   the building stack, associated with the layout builder, the building stack being organized as hierarchically nested box builders; and
   one or more layout boxes comprising persistent data, the one or more layout boxes being immutable and including internal positioned content and sizing information;
   wherein the box builder is a class that represents common properties and methods of different box builder types, individual box builder types being configured to build a corresponding particular type of layout box, utilizing a set of virtual functions that are defined as an abstract class of the box builder.

2. The one or more computer-readable hardware storage media of claim 1, wherein the one or more layout boxes comprise one or more container boxes and/or one or more line boxes, wherein the one or more container boxes and the one or more line boxes are sub-classes of a layout box.

3. The one or more computer-readable hardware storage media of claim 1, wherein the one or more layout boxes comprise one or more container boxes and/or one or more line boxes, wherein the one or more container boxes and the one or more line boxes are sub-classes of a layout box, and wherein container boxes are configured to contain other container boxes and other line boxes.

4. The one or more computer-readable hardware storage media of claim 1, wherein the layout builder is configured to instantiate the one or more layout boxes.

5. The one or more computer-readable hardware storage media of claim 1, wherein the layout builder is configured to communicate with the one or more box builder types effective to cause the one or more layout boxes to be populated with content that is to be rendered.

6. The one or more computer-readable hardware storage media of claim 1, wherein the structured document comprises an HTML document and the layout builder implements methods to enable sequential layout processing, wherein the methods include at least one of the following:
   a method to build a line of text,
   a method that is executed when the layout builder encounters an opening HTML tag, or
   a method that is executed when the layout builder encounters an ending HTML tag.

7. The one or more computer-readable hardware storage media of claim 1, wherein the structured document comprises an HTML document and the layout builder is configured to encounter an opening HTML tag and create a corresponding box builder type.

8. The one or more computer-readable hardware storage media of claim 1, wherein the structured document comprises an HTML document and the layout builder is configured to encounter an opening HTML tag and create a corresponding box builder type, and wherein the layout builder is configured to encounter an associated closing HTML tag and cause a layout box associated with the corresponding box builder type to be attached to a display tree.

9. One or more computer-readable hardware storage media embodying computer-executable instructions which, when executed, implement a software architecture comprising:
   a layout builder component of a browser configured to organize sequential layout processing for rendering of a received HTML document, the layout builder being a temporary object that exists during layout processing, the sequential layout processing comprising:
      identifying an opening tag in the received HTML document;
      responsive to the identification, creating a box builder;
      pushing the created box builder onto a building stack to activate the created box builder;
   the box builder representing a class of box builder types, configured to:
      receive content for one of one or more layout boxes, from the layout builder, the one or more layout boxes being immutable, comprising persistent data, and including internal positioned content and sizing information;
      populate the one of the one or more layout boxes with the received content to be rendered by the browser;
   the building stack, associated with the layout builder, the building stack being organized as hierarchically nested box builders; and
   a set of virtual functions defined as a class of the box builder and configured to enable sequential, non-recursive processing of a received HTML document.

10. The one or more computer-readable hardware storage media of claim 9, wherein the virtual functions include a function to initialize the box builder and place the box builder in context of a current layout building process.

11. The one or more computer-readable hardware storage media of claim 9, wherein the virtual functions include a function to request a next position for the layout builder to process.

12. The one or more computer-readable hardware storage media of claim 9, wherein the virtual functions include a function to request whether an existing box can be reused for a given block.

13. The one or more computer-readable hardware storage media of claim 9, wherein the virtual functions include a function to request whether an existing box can be reused for a given block, and a function that is called when a reusable box is found.

14. The one or more computer-readable hardware storage media of claim 9, wherein the virtual functions include a function to request whether an existing box can be reused for a given block, and a function that is called when no reusable box is found.

15. The one or more computer-readable hardware storage media of claim 9, wherein the virtual functions include a function to notify a parent box builder that an associated child box can be attached in a resulting layout tree.

16. The one or more computer-readable hardware storage media of claim 9, wherein the virtual functions include a function to notify the box builder that the layout builder has reached an end of processing associated with the box builder.

17. A computer-implemented method comprising:
receiving a structured document in a browser;
processing by a layout builder of the browser for rendering of the received structured document in a sequential, non-recursive fashion effective to enable associated content to be rendered, the layout builder being a temporary object that exists during layout processing, the processing comprising:
identifying an opening tag in the received structured document;
responsive to the identifying, creating a box builder;
pushing the created box builder onto a building stack to activate the created box builder, the building stack being organized as hierarchically nested box builders;
sending content for one of one or more layout boxes to the created box builder, effective to enable the box builder to populate the layout box with the content, the content to be rendered by the browser, the one or more layout boxes being immutable, comprising persistent data, and including internal positioned content and sizing information; and
wherein the box builder is a class that represents common properties and methods of different box builder types, individual box builder types being configured to build a corresponding particular type of layout box utilizing a set of virtual functions that are defined as an abstract class of the box builder.

18. The method of claim 17, wherein said processing comprises creating tag-specific box builders that are specifically configured to construct layout boxes that are utilized to render the associated content.

19. The method of claim 17, wherein the structured document comprises an HTML document.

20. The method of claim 17, wherein said processing comprises performing parallel execution of sequential layout operations.

* * * * *